United States Patent [19]
Garforth-Bles

[11] Patent Number: 5,176,395
[45] Date of Patent: Jan. 5, 1993

[54] WHEELED VEHICLE FOR CARRIAGE OF CHILDREN CONVERTIBLE BETWEEN JOGGING AND BICYCLE TRAILER CONFIGURATION

[76] Inventor: Timothy Garforth-Bles, TOR House, 1511 19th Ave., SW., Calgary, Alberta, Canada, T2T 0J2

[21] Appl. No.: 780,927

[22] Filed: Oct. 22, 1991

[51] Int. Cl.⁵ .................................................. B62B 3/02
[52] U.S. Cl. ............................. 280/415.1; 280/7.12; 280/24; 280/62; 280/204
[58] Field of Search ............... 280/62, 30, 647, 648, 280/650, 657, 658, 7.12, 23.1, 7.17, 7.1, 7.15, 24, 278, 287, 704, 415.1

[56] References Cited

U.S. PATENT DOCUMENTS

| | | | |
|---|---|---|---|
| D. 297,525 | 9/1988 | Baechler | D12/129 |
| 462,684 | 11/1891 | Bouton | 280/23.1 |
| 2,798,727 | 7/1957 | Jensen et al. | 280/7.17 |
| 2,854,241 | 9/1958 | Dobrowolski | 280/7.17 |
| 3,202,437 | 8/1965 | Masbruch | 280/24 |
| 3,659,865 | 5/1972 | Nothacker | 280/7.1 |
| 3,887,208 | 6/1975 | Vidal | 280/36 C |
| 4,171,139 | 10/1979 | Cockram | 280/652 |
| 4,729,574 | 3/1988 | Tipke | 280/415 R |
| 4,759,559 | 7/1988 | Moulton | 280/40 |
| 4,848,780 | 7/1989 | Straub | 280/1.5 |
| 4,934,728 | 6/1990 | Chen | 280/650 |
| 4,953,880 | 9/1990 | Sudakoff et al. | 280/47.38 |
| 5,020,814 | 6/1991 | George et al. | 280/204 |
| 5,029,891 | 7/1991 | Jacobs | 280/62 |
| 5,076,599 | 12/1991 | Lockett et al. | 280/657 |

OTHER PUBLICATIONS

Rustadstuen Pulkfabrikk brochure entitled "Fjellpulken" (12 pages).
Winchester Originals "Folding Bicycle Children's Trailer" brochure (2 pages).
Racing Stollers, Inc., "Now You Can Run With Your Kids?" brochure (6 pages).

Primary Examiner—David M. Mitchell
Attorney, Agent, or Firm—Weingarten, Schurgin, Gagnebin & Hayes

[57] ABSTRACT

A multi-purpose sports vehicle for the carriage of children which can readily be converted between a wheeled stroller which is pushed by a person jogging or running to a wheeled trailer for convenient towing behind a bicycle or the like. In a third configuration, the wheels are removed and the vehicle can be used as a sled, or "pulk", to be pulled by a dog or a skier. The ready conversion between uses is particularly convenient and economic to the year round sports person.

9 Claims, 12 Drawing Sheets

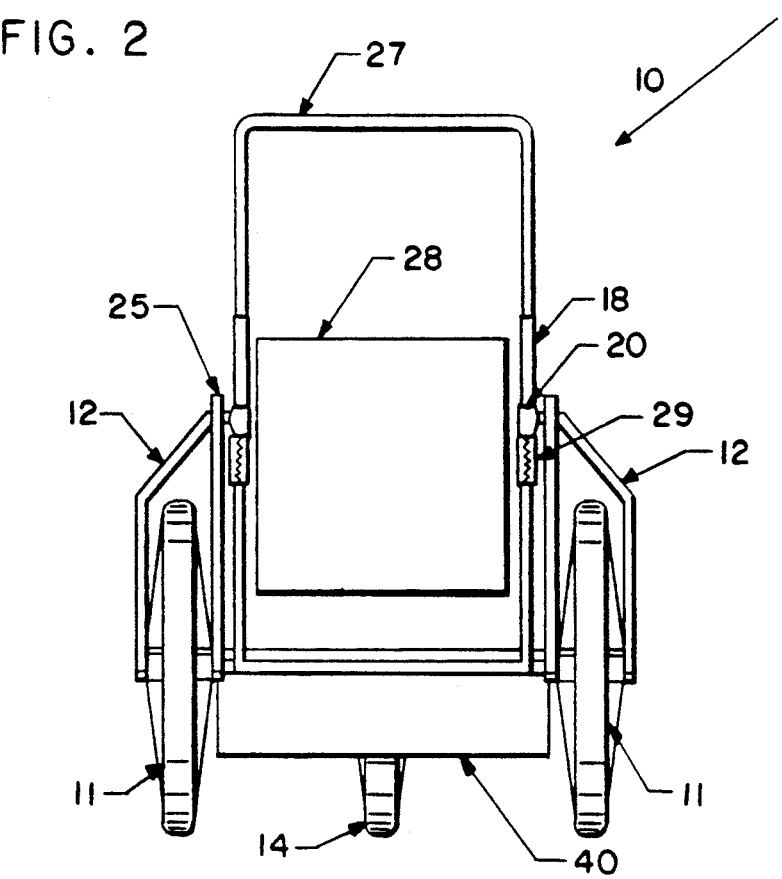
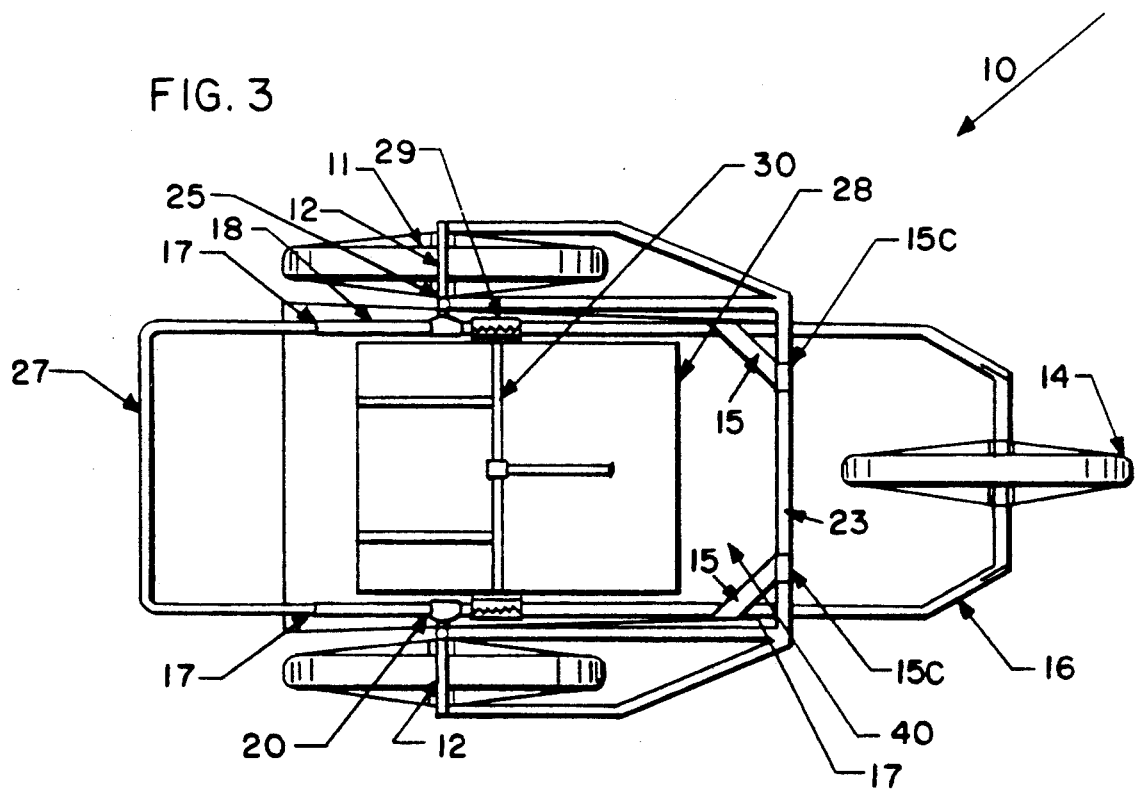

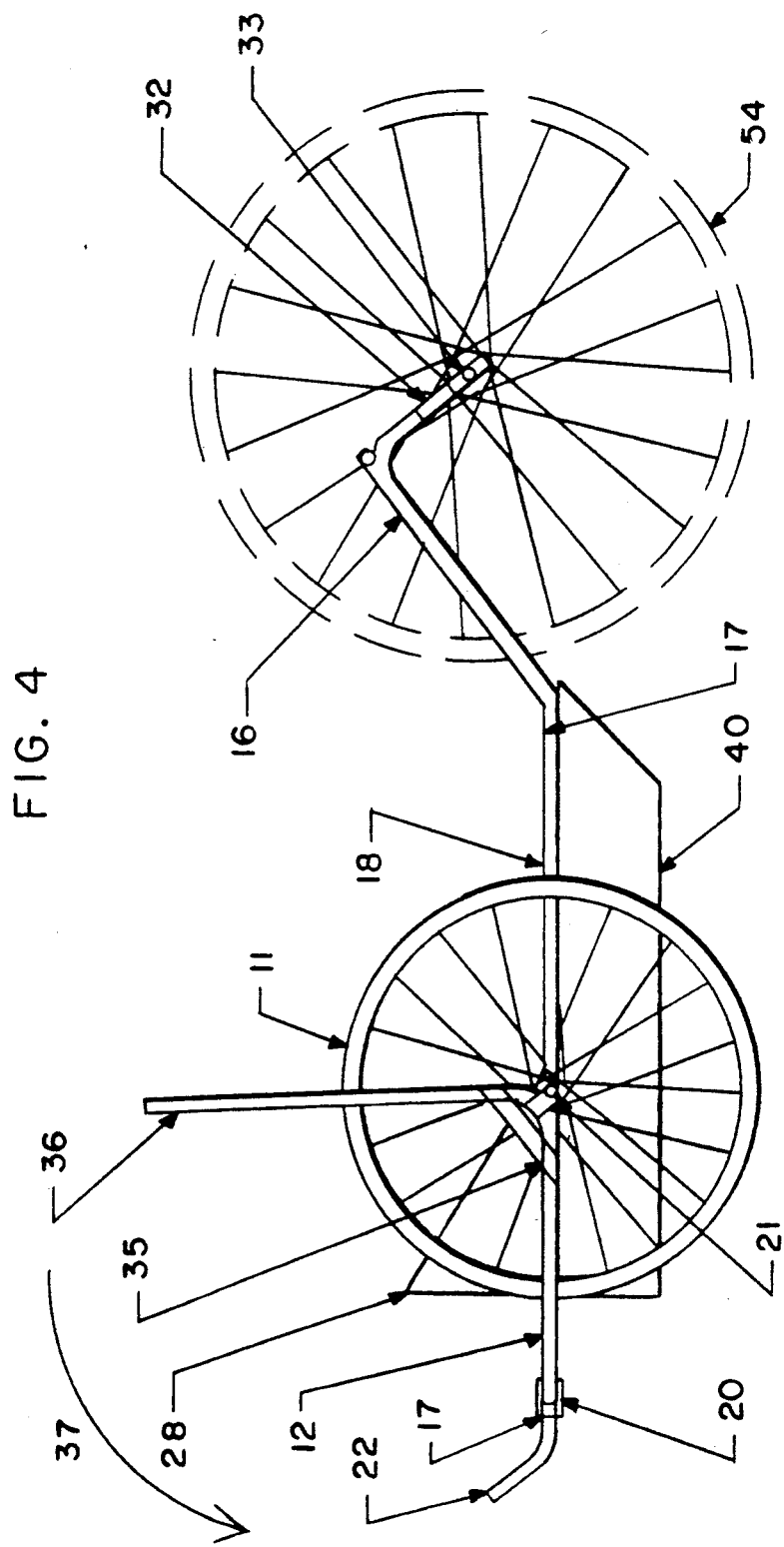

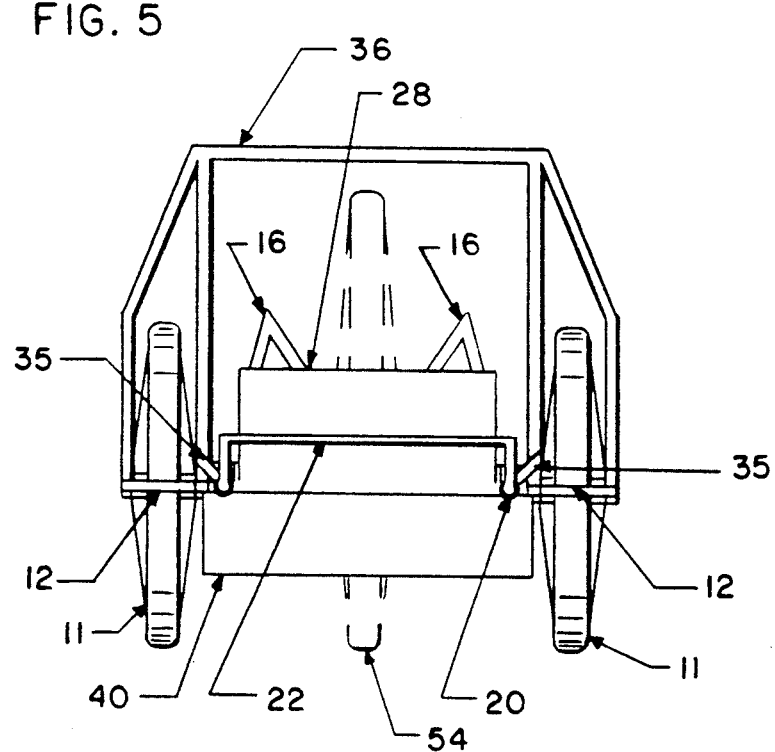
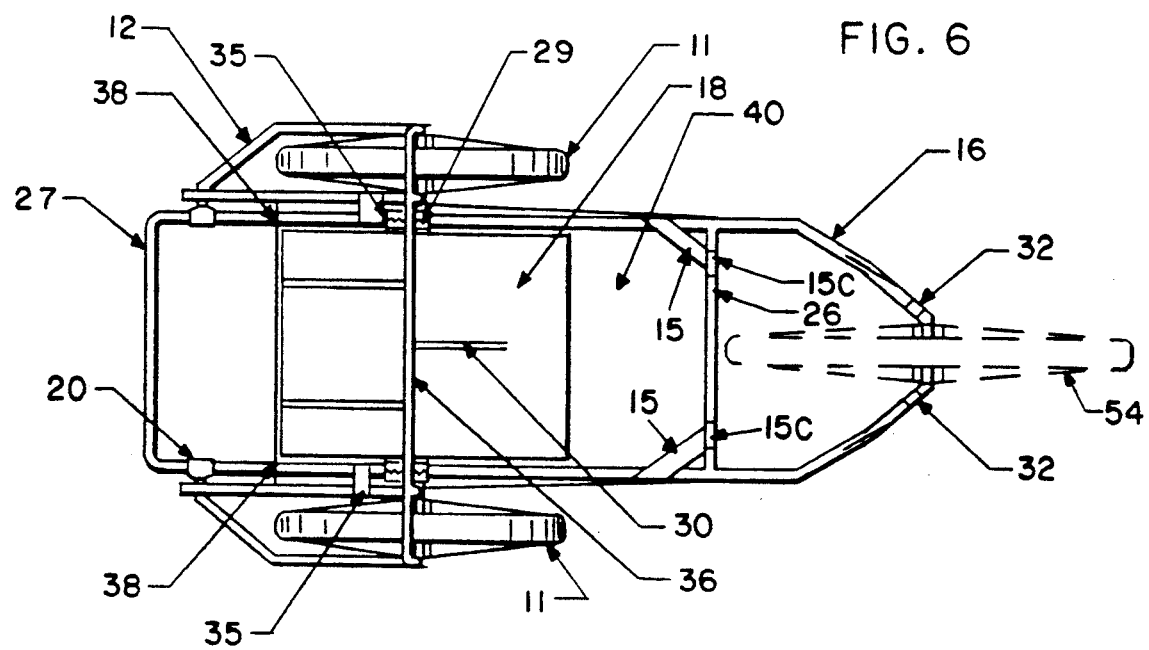

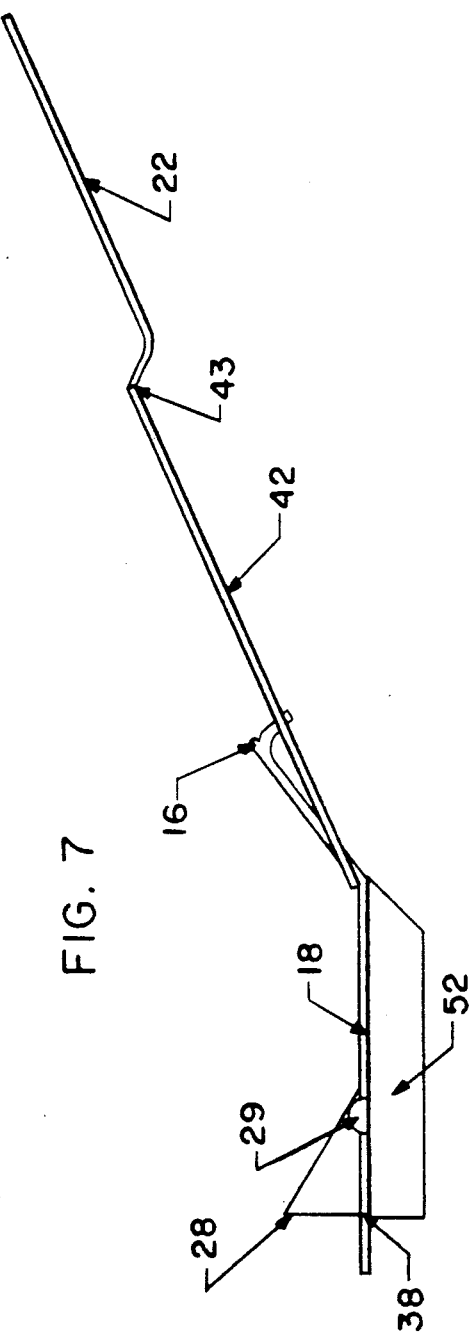
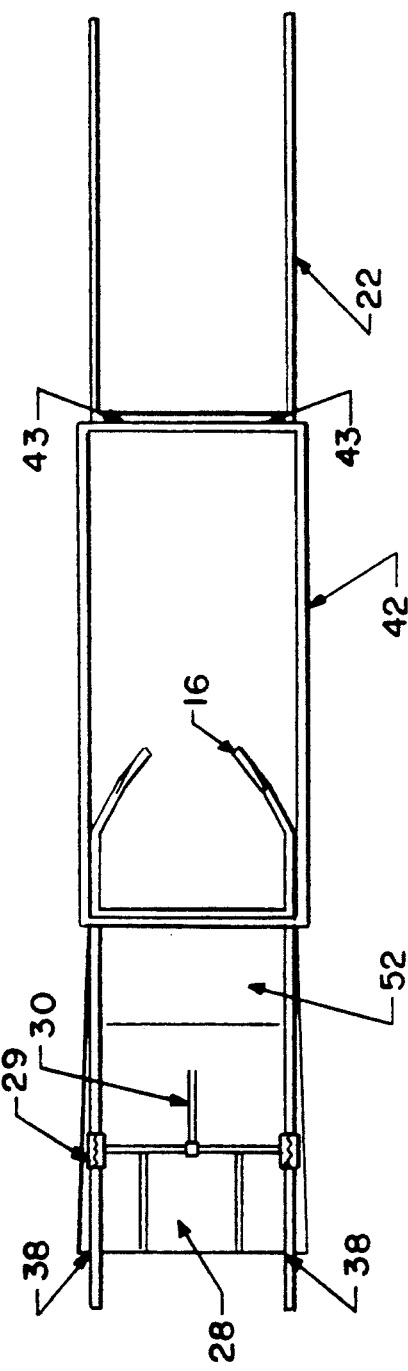
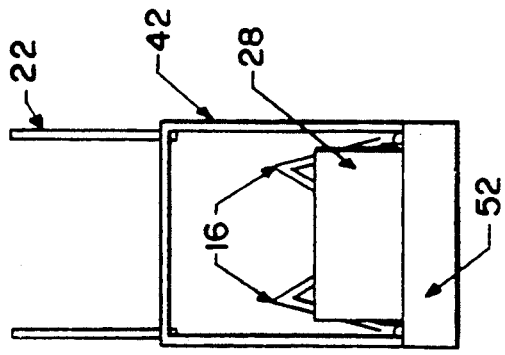

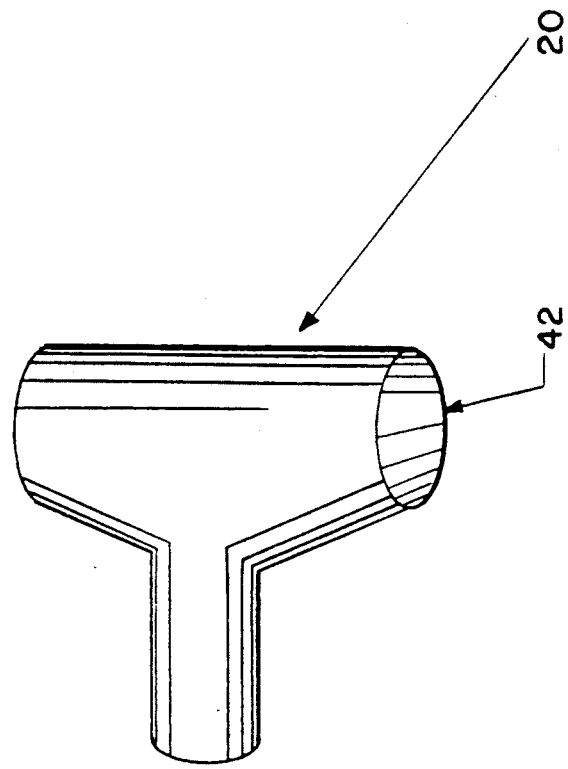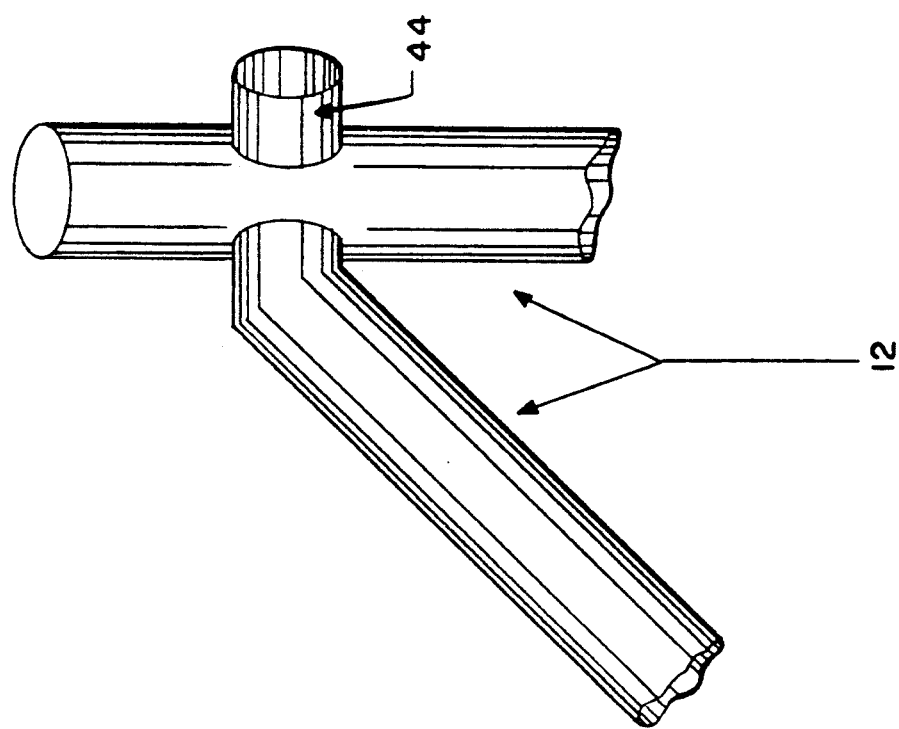
FIG. 10

WHEELED VEHICLE FOR CARRIAGE OF CHILDREN CONVERTIBLE BETWEEN JOGGING AND BICYCLE TRAILER CONFIGURATION

FIELD OF THE INVENTION

This invention relates to multi-purpose sports vehicles and in particular to a wheeled stroller which is pushed by a runner and which is converted conveniently to a trailer so that the sports person can also tow the vehicle behind a bicycle. The vehicle may also be configured to include a sled bottom and to be detachable to be pulled by a skier or dog.

BACKGROUND OF THE INVENTION

The prior art to the invention includes strollers which can be pushed in front of a person who is walking or jogging to permit a parent to exercise while providing entertainment and company to a child. At the same time, the child enjoys the outdoors. Also, in the prior art are carriages or carts which may be attached to, and towed behind, bicycles. What the prior art does not provide but the present invention does, is a vehicle which is readily and conveniently adjustable between a sports vehicle for use by joggers and runners and a trailer to be towed by the sports cyclist. In a third configuration, the present invention includes sled which may be used as a downhill sled or may be pulled by a skier or dog.

SUMMARY OF THE INVENTION

The present invention provides a convenient, readily convertible, multi-use vehicle for the sports person with children. In a first configuration, the present invention is a wheeled stroller which is pushed in front of a runner or jogger. The wheels and seat are mounted on a frame which may be constructed of light-weight tubular metal. In one embodiment of this configuration, the vehicle has two rear wheels and a single front wheel and the seat is mounted on the handle. The present invention is readily converted into its second configuration as a trailer for use by the increasing number of recreational and sports cyclists. The front wheel is removed and the front wheel forks are slidingly reconfigured and connected to a bicycle. To provide an additional safety feature for the occupant, a roll-bar may be incorporated in case of an accident. In another embodiment, the invention includes sled or "pulk" which can be used on its own downhill or may be pulled behind a skier or a sled dog.

DESCRIPTION OF THE DRAWING

Other objects, features and advantages of the invention will be best understood from the following detailed description, taken in conjunction with the following drawing in which:

FIG. 2 is a rear view of the present invention in the jogging configuration;

FIG. 3 is a plan view of the present invention in the jogging configuration;

FIG. 4 is a side view of the present invention in the cycle trailer configuration;

FIG. 5 is a rear view of the present invention in the cycle trailer configuration;

FIG. 6 is a plan view of the present invention in the cycle trailer configuration;

FIG. 7 is a side view of the present invention in the sled configuration;

FIG. 8 is a rear view of the present invention in the sled configuration;

FIG. 9 is a plan view of the present invention in the sled configuration;

FIG. 10 illustrates an embodiment of the rotating collar of the present invention;

DETAILED DESCRIPTION

Figure 13:
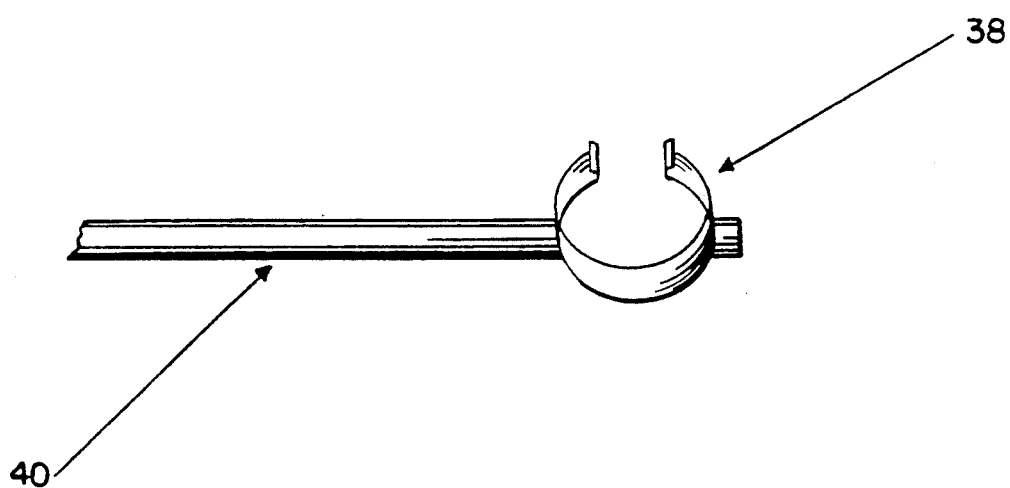
FIG. 13 illustrates an embodiment of the sled clips of the present invention.

Referring to FIGS. 1, 2, 3 and 3a of the drawings, an embodiment of the sports vehicle 10 of the present invention in the jogging configuration is illustrated. Rear wheels 11 are rotatably mounted on rear wheel forks assembly 12 by known means, such as by nut and bolt. Front wheel 14 is removably mounted between front wheel fork 16. A handle 18 is adjustably and slidingly connected to rear wheel forks assembly 12 by rotating collars 20 which are shown in detail in FIG. 10. Additionally, the forward transverse member 23 of rear wheel forks assembly 12 is releasably attached to a transverse member of the front wheel fork 16 by front clips 15 which are shown in detail in FIG. 11. Handle 18 is integral with front wheel fork 16. Handle 18 may be retractable, such as by providing telescoping member 22 which includes grip portions 19 and push bar 27 so that the jogger can push vehicle 10 by grasping either grip portions 19 or push bar 27. The telescoping feature of handle 18 also compensates for differing heights of jogger. To provide added safety in case of accident, a roll-bar 24 can be removably attached by known means to rear wheel forks assembly 12 at insert points 25. A seat 28 is rotatably and tiltably mounted between handle 18 and is adjustable using known pivotally adjustable seat mounting means 29. A child is seated in seat 28 and may be secured in place by a seat harness 30. Additional features include a storage tray 40 and a canopy (not shown) which may be fastened to the inside of roll-bar 24 and to snaps 13 on handle 18. Referring to FIG. 13, storage tray 40 may include tray clips 38 which permit the storage tray 40 to be clipped to handle 18. With the passenger seated, and roll-bar 24 attached to provide further protection, the vehicle is pushed in front of a jogger who grasps handle 18.

Referring now to FIG. 10, an embodiment of the rotating collar 20 of the present invention is illustrated. Rotating collar 20 includes a cylindrical aperture 42 which receives handle 18. Rotating collar 20 is rotatably attached to stub 44 of rear wheel forks assembly 12. When rear wheel forks assembly 12 is rotated around rear axle 21 in the direction of arrow 37, as shown in FIGS. 1 and 4, rotating collar 20, connected to rear wheel forks assembly 12, slides along handle 18 towards telescoping member 22 to the position shown in FIG. 4.

Figure 6A:
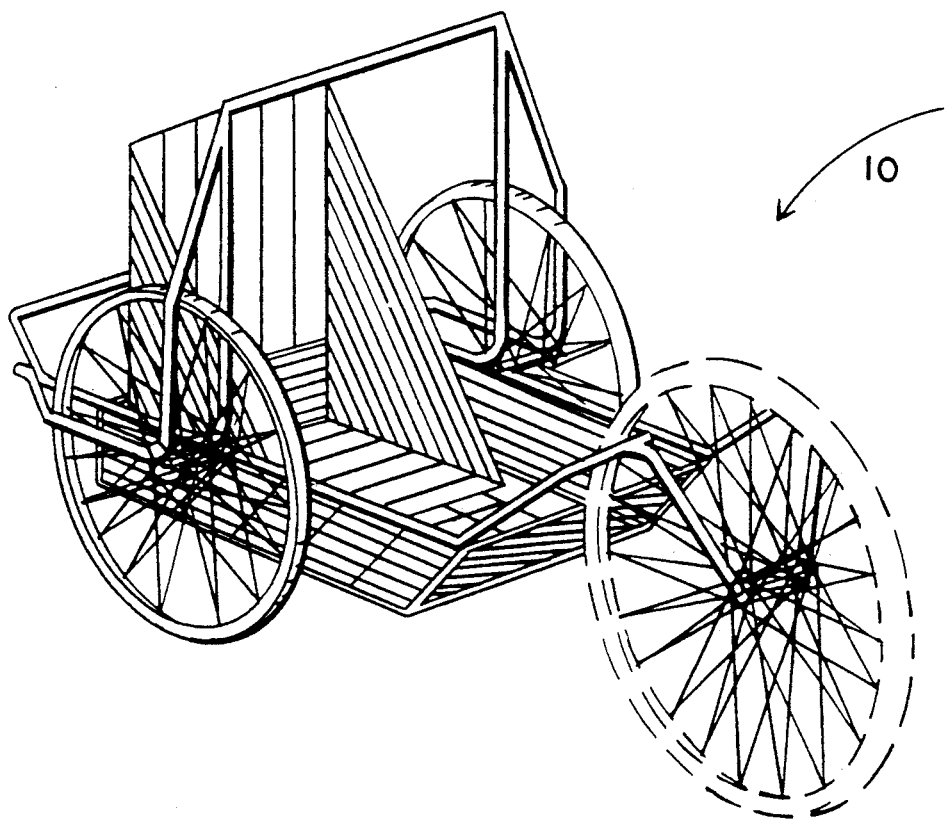
FIG. 6a is a perspective view of the present invention in the cycle trailer configuration.
Figure 9A:
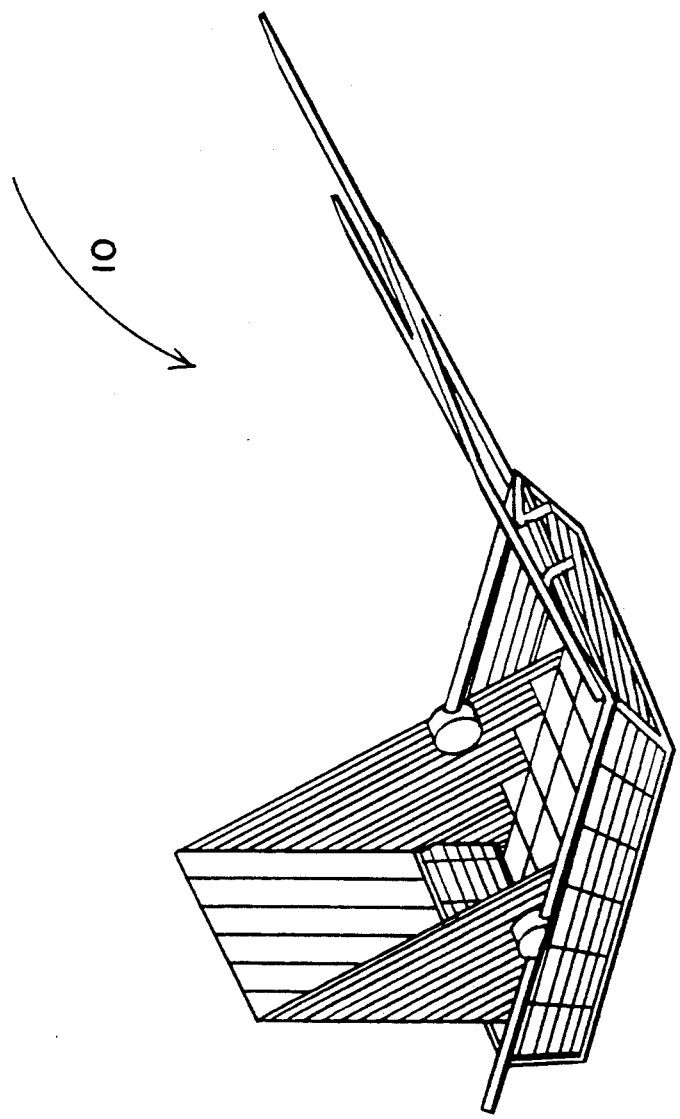
FIG. 9a is a perspective view of the present invention in the sled configuration.
Figure 11A:
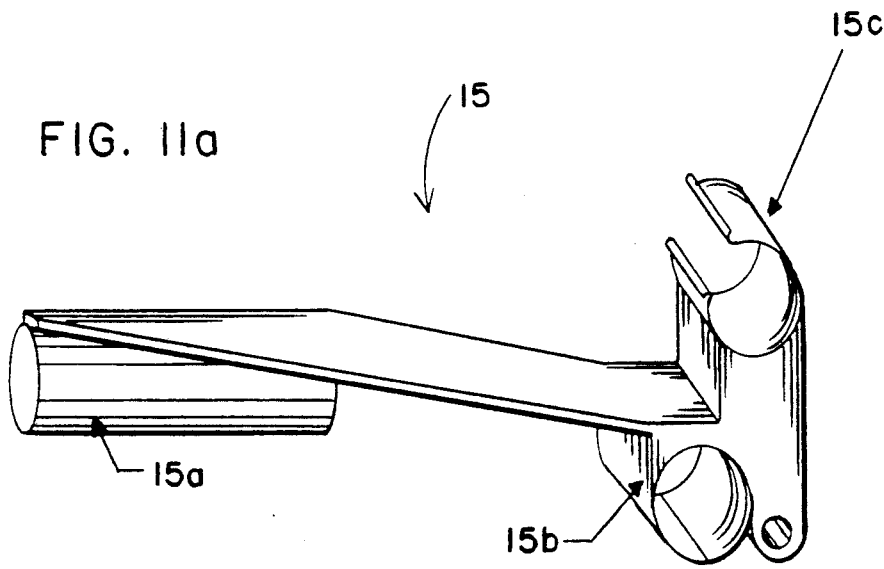
FIG. 11a illustrates an embodiment of the front clip member of the present invention.

Referring now to FIG. 11a, an embodiment of the front clip member 15 of the present invention is illustrated. Front clip member 15 comprises first and second mounting tubes, 15a, 15b, respectively which receive front wheel fork assembly 16 and 26, respectively, and are located as shown in FIG. 6, and clip 15c. When so mounted, clip 15c protrudes upwardly to receive transverse member 23 of rear wheel forks assembly 12 when the vehicle 10 is in the jogging configuration as illustrated in FIG. 1.

Figure 12:
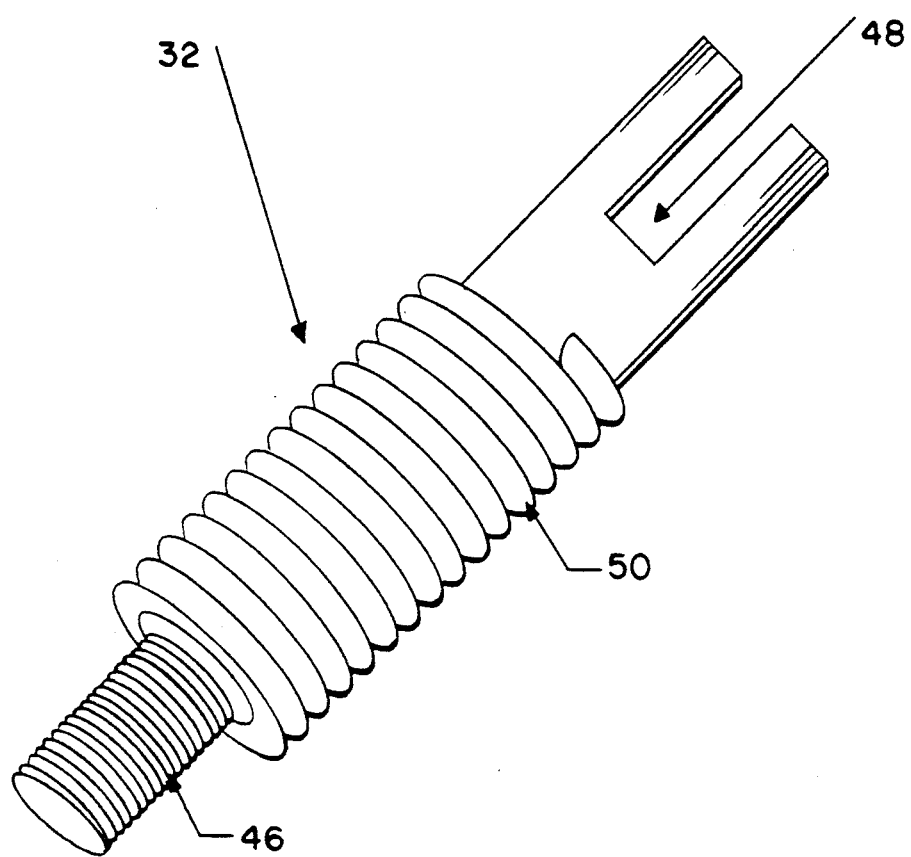
FIG. 12 illustrates an embodiment of the front wheel fork assembly extensions of the present invention.

Referring now also to FIGS. 4, 5, 6 and 6a, the vehicle of FIGS. 1-3a, converted to the bicycle trailer configuration, is illustrated. The conversion is conveniently effected by first removing front wheel 14 from front wheel fork 16. Thereafter, two attachable extensions 32, shown in detail in FIG. 12, are attached to front wheel fork 16 and connected to the rear wheel axle 33 of the towing bicycle wheel 54 shown in phantom. When so connected to front wheel fork 16, extensions 32 compensate for turns made by the towing bicycle and for undulations in the surface upon which the vehicle is being towed.

Figure 1:
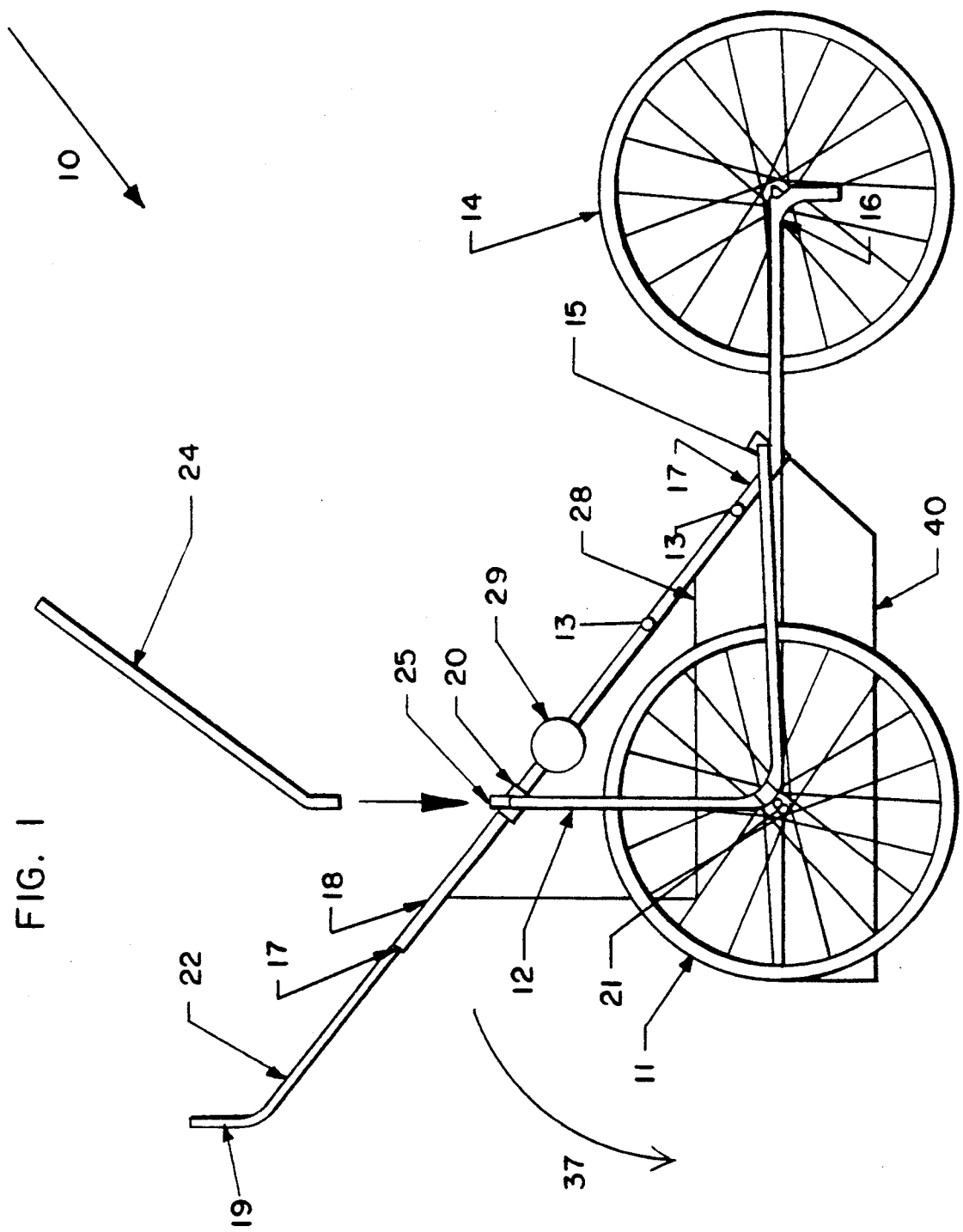
FIG. 1 is a side view of the present invention in the jogging configuration.
Figure 3A:
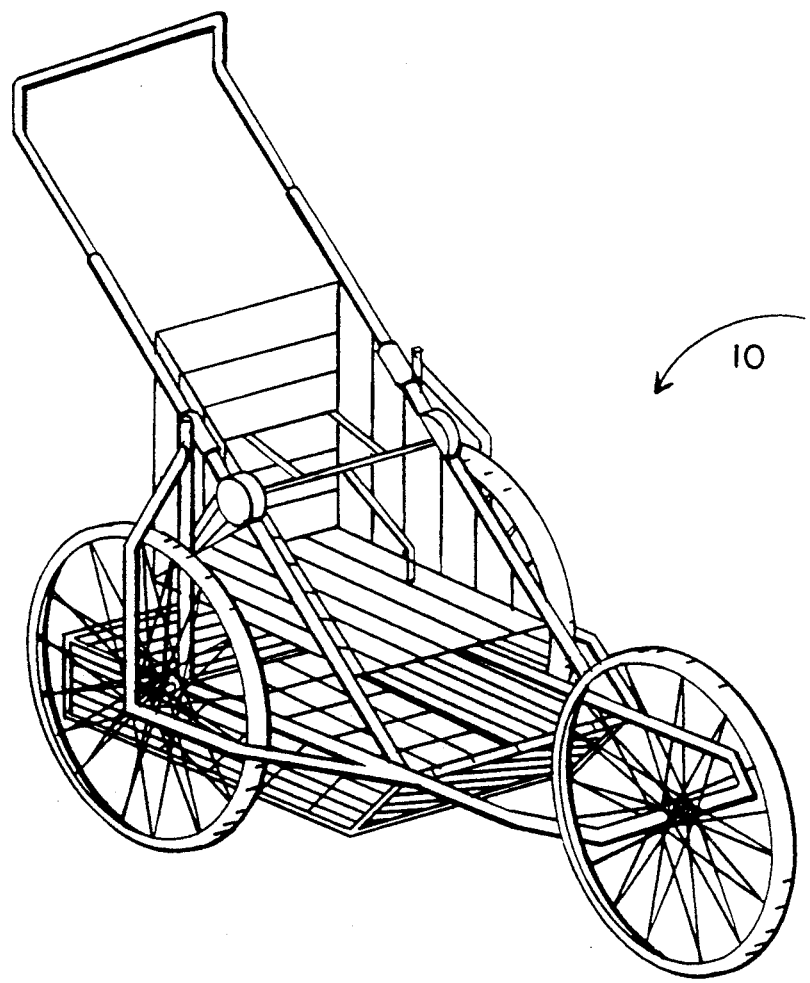
FIG. 3a is a perspective view of the present invention in the jogging configuration.
Figure 11B:
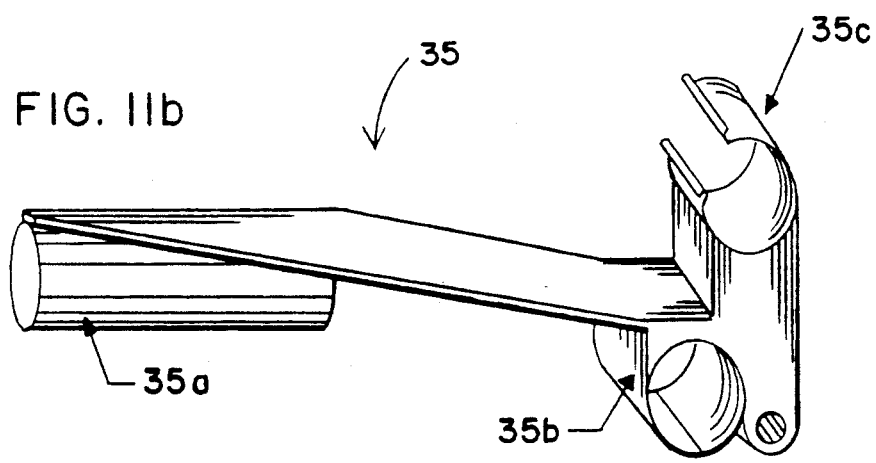
FIG. 11b illustrates an embodiment of the rear clip member of the present invention.

Conversion to the trailer configuration is completed by removing forward transverse portion 23 of rear wheel forks assembly 12 from front clips 15c and rotating rear wheel forks assembly 12 through approximately 90 degrees around rear axle 21 in the direction of arrow 37 in FIGS. 1 and 4 into a vertical position to become roll-bar 36. This rotation brings forward transverse portion 21 into the vertical position 36 shown in FIGS. 4 and 5, to provide protection as a roll-bar. Handle 18 is held in position by rear clip members 35 mounted on rear wheel forks assembly 12. As shown in FIG. 11b, rear clip members 35 have substantially the same design as front clip members 15. First and second mounting tubes 35a, 35b of rear clip members 35 receive rear wheel forks assembly 12. Rear clips 35c are thereby disposed inboard of rear wheel forks assembly 12 to receive handle 18. Rotation of wheel forks assembly also urges handle 18 into the horizontal position as shown in FIG. 4 which drops seat 28 into storage tray 40. Seat 28 is then rotated into an upright position using seat adjusters 29 and telescoping member 22 is retracted.

Referring now to FIG. 12 an embodiment of the front wheel fork extensions 32 is illustrated. Extension 32 comprises a screw 46 which is screwed into a threaded hole disposed at the distal end of front wheel fork assembly 16 as shown in FIG. 4. Axle mounting member 48 is slotted onto the rear axle 33 of the towing bicycle also shown in FIG. 4 and secured in place on the rear axle 33 by a nut. Shock-absorbing spring means 50 are disposed intermediate the screw 46 and the axle mounting member 48 to cushion the ride.

Referring now to FIGS. 7, 8, 9 and 9a, the sled configuration of the present invention is illustrated. The sled 52, or "pulk" as it is also known as in certain parts, may be manufactured of fiberglass or other suitable material and is of a conventional sled shape. The storage tray 40, previously described, may be shaped as a sled so as to provide a dual storage and sledding function. Removeable securement of sled 52 to handle 18 is by known means, such as by clips or nut and bolt as previously described. To complete the conversion to the sled configuration, front wheel 14 and rear wheels forks assembly 12, complete with rear wheels 11, are removed. Seat 28 is pivotally adjusted by seat mounting means 29 to the desired angular placement in sled 52. For use on snow, sled 40 can be pulled by a dog or skier grasping, or attached to, front wheel fork 16. For example, front wheel fork 16 may be attached to a skier's belt. Alternatively, a pull bar 42 may be clipped into front clips 15, Or telescoping member 22 may be removed from handle 18 and clipped into front clips 15. If a further extension is desired, telescoping member 22 can be attached to pull bar 42 shown in FIGS. 7 and 9, by clips or the like.

The description above is intended to be exemplary of the present invention which is defined according to the following claims:

I claim:

1. A multi-purpose sports vehicle convertible between a stroller configuration and a trailer configuration, comprising
    a rear wheel assembly including front transverse member and rear end and first and second sides;
    a pair of wheels rotatably mounted on the first and second sides proximate the rear end of said rear wheel assembly;
    an integral handle and front wheel fork;
    a wheel rotatably mounted on said front wheel fork;
    front clip means mounted on said integral handle and front wheel fork for releasable receipt of said rear wheel assembly front transverse member;
    rear clip means mounted on said rear wheel assembly for releasable receipt of said integral handle and front wheel fork;
    rotating collar means mounted on said rear wheel assembly and slidingly connected to said handle; and
    a seat mounted on the vehicle.

2. The vehicle of claim 1 wherein said seat is mounted on said handle.

3. The vehicle of claim 1 further including a roll bar connected to said rear wheel assembly.

4. The vehicle of claim 1 further including a sled depending from said integral handle and front wheel fork.

5. The vehicle of claim 1 further including means disposed on said front wheel fork for connecting the vehicle to a bicycle.

6. The vehicle of claim 5 wherein said bicycle connecting means comprises a slot disposed in said front wheel fork.

7. The vehicle of claim 1 wherein said vehicle is manufactured substantially of tubular metal.

8. The vehicle of claim 7 wherein said vehicle is manufactured substantially of aluminum.

9. The vehicle of claim 4 further including a pull bar connected to said sled.

* * * * *